(12) United States Patent
Handwerk et al.

(10) Patent No.: US 10,302,095 B2
(45) Date of Patent: May 28, 2019

(54) EDGE-FREE BLOWER COOLING INTERFACE

(71) Applicant: Hanon Systems, Daejeon (KR)

(72) Inventors: Detlef Handwerk, Köln (DE); Johannes Stausberg, Köln (DE); Harald Jung, Bornheim (DE)

(73) Assignee: HANON SYSTEMS, Daejeon (KR)

( * ) Notice: Subject to any disclaimer, the term of this patent is extended or adjusted under 35 U.S.C. 154(b) by 246 days.

(21) Appl. No.: 15/241,225

(22) Filed: Aug. 19, 2016

(65) Prior Publication Data
US 2017/0051750 A1 Feb. 23, 2017

(30) Foreign Application Priority Data
Aug. 20, 2015 (DE) .................. 10 2015 113 785

(51) Int. Cl.
| | |
|---|---|
| F04D 25/06 | (2006.01) |
| F04D 25/08 | (2006.01) |
| G06F 1/20 | (2006.01) |
| F04D 29/40 | (2006.01) |
| F04D 29/42 | (2006.01) |

(Continued)

(52) U.S. Cl.
CPC .......... *F04D 29/422* (2013.01); *F04D 17/16* (2013.01); *F04D 25/06* (2013.01); *F04D 25/082* (2013.01); *F04D 29/403* (2013.01); *F04D 29/4246* (2013.01); *F04D 29/584* (2013.01);

(Continued)

(58) Field of Classification Search
CPC .. F04D 29/40; F04D 29/5806; F04D 29/5813; F04D 29/582; F04D 29/584; F04D 25/06; F04D 25/08; F04D 25/082; F04D 29/403; F04D 29/4206; F04D 29/42; F04D 29/4226; F04D 29/4246; F04D 29/422; G06F 1/203
See application file for complete search history.

(56) References Cited

U.S. PATENT DOCUMENTS

2007/0237626 A1    10/2007    Pouysegur

FOREIGN PATENT DOCUMENTS

| | | |
|---|---|---|
| DE | 10029546 A1 | 12/2001 |
| JP | H07005821 U | 1/1995 |

(Continued)

OTHER PUBLICATIONS

JP4830899 English Translation, generated Aug. 5, 2008, Shiraishi Akira.*

*Primary Examiner* — Bryan M Lettman
(74) *Attorney, Agent, or Firm* — Shumaker, Loop & Kendrick, LLP; James D. Miller

(57) ABSTRACT

A cooling air interface in a fan housing provided for diverting an amount of cooling air to cool a fan motor from a main air flow on a compression side of the fan, and delivering the cooling air to the fan motor to be cooled. The interface including a cooling air channel with an intake opening emptying into a cooling air passage having a cooling air exit opening where the cooling air is brought to the fan motor. Wall sections of the main air flow path that adjoin the intake opening, which in relation to the direction of the main air flow, are located upstream and downstream of the intake opening, extend up to the adjoining intake opening and into the cooling air channel, transitioning into the cooling air channel walls situated opposite one another in the form of rounded surfaces without corners and edges.

5 Claims, 5 Drawing Sheets

(51) Int. Cl.
   *F04D 29/58*          (2006.01)
   *F04D 17/16*          (2006.01)
(52) U.S. Cl.
   CPC ..... *F04D 29/5806* (2013.01); *F04D 29/5813* (2013.01); *G06F 1/203* (2013.01)

(56)         References Cited

FOREIGN PATENT DOCUMENTS

| | | | |
|---|---|---|---|
| JP | 2008202502 | * | 9/2008 |
| JP | 2008203502 | A | 9/2008 |
| JP | 4830899 | B2 | 12/2011 |
| KR | 20120062387 | A | 6/2012 |

* cited by examiner

EDGE-FREE BLOWER COOLING INTERFACE

CROSS-REFERENCE TO RELATED PATENT APPLICATION

This patent application claims priority to German Patent Application No. DE 102015113785.2 filed on Aug. 20, 2015, the disclosure of which is incorporated herein by reference in its entirety.

FIELD OF THE INVENTION

The invention relates to a cooling air interface in a fan housing, which is provided for diverting an amount of cooling air required to cool the fan motor from a main air flow on the compression side of the fan, and for delivering this cooling air to the fan motor to be cooled.

BACKGROUND OF THE INVENTION

For cooling and air conditioning of motor vehicles, as a rule, compact units, named hereinafter HVAC (heating, ventilation and air conditioning devices), are used, which contain the components necessary for the requirement. One component required within an HVAC unit is the fan, which directs air through the HVAC unit for purposes of treatment, for example purification or conditioning. The air is brought to the fan in recirculation mode from the vehicle interior, in fresh-air mode from the vehicle exterior, or in mixed mode in the form of a mixture of fresh and recirculated air. Along with mechanical power at the impeller, the electric motor also generates waste heat, which as a rule is removed by means of air circulation. For this, on the compression side of the fan, an interface is inserted into the air flow, which delivers the amount of air necessary for cooling the motor. The heated air then flows out of the electric motor back to the suction side of the fan.

High air velocities along with the arrangement and geometry of the HVAC interface to the cooling air channel of the motor very often result in tonal effects, which have a negative impact on the acoustic properties of the air conditioner. In most cases, interfaces that have straight edges or corners are used, which in the air flow lead to more or less severe disturbances and, often associated therewith, to tonal effects.

JP 2008 203502 A describes a fan in which a portion of the air flowing in an output passage of a spiral-shaped air flow path is directed into an intake opening of a cooling air passage through an air supply channel, which—proceeding from an air inlet opening—is uniformly curved in an S shape. Since the air supply channel—proceeding from the intake opening of the cooling air passage—has an S shape with a plurality of curves, only little resonance noise that is generated in the cooling air passage emerges through the air supply channel into the output passage. The fan is thereby intended to reduce disturbing resonance noises from the cooling air passage and simultaneously ensure a sufficient air volume for motor cooling.

The object of the invention is to define a geometry of the HVAC interface to the cooling air passage of the fan which has as little negative impact as possible on the main airflow, and also does not detrimentally alter the acoustic behavior, if possible. Additionally, it is the goal to supply the cooling air passage to the fan with the required air quantity under all operating conditions if possible, and as much as possible to prevent dirt and moisture from penetrating.

SUMMARY OF THE INVENTION

The object is attained by a cooling air interface with the features as described herein.

The cooling air interface of the invention is disposed in a fan housing and provides for the diversion of an amount of cooling air required to cool the fan motor from a main air flow on the compression side of the fan, and for delivery of this cooling air to the fan motor to be cooled. The cooling air interface comprises a cooling air channel with an intake opening which empties into a cooling air passage having a cooling air exit opening, via which the cooling air can be brought to the fan motor. Wall areas of the main air flow path adjoining the intake opening, which—in relation to the direction of the main air flow—are located upstream and downstream of the intake opening, continue up to the adjoining intake opening and into the cooling air channel, transitioning into cooling air channel walls of the cooling air channel disposed opposite one another, in the form of rounded surfaces without corners or edges.

The opposing cooling air channel walls are preferably provided at least in part with a uniform curvature or a constantly changing curvature, so that the cooling air channel is configured as curved at least in part. In one especially advantageous embodiment the entire cooling air channel has a curved shape, thus at no point are there edges, in other words, no abrupt changes in the curvature of the opposing cooling air channel walls. The cooling air channel walls, and thus the cooling air channel, are preferably curved into a spiral, in which the front cooling air channel wall with respect to the main air flow, proceeding from the intake opening, is the inner, and thus shorter wall of the spiral, while the rear cooling air channel wall forms the outer, longer wall of the spiral.

According to one embodiment of the invention, the cooling air channel empties into a cooling air passage, wherein, in the cooling air passage, a rib for holding back water is provided downstream of the emptying point of the cooling air channel but upstream of the cooling air exit opening, with respect to the flow direction of the cold air.

The concept according to the invention consists in eliminating corners and edges in the area of the cooling air interface to the cooling air passage of the fan motor, and using only rounded surfaces in this area. In this connection, what counts as rounded or curved surfaces without edges are surfaces without an abrupt change in curvature: curvature here describes a change in the direction of the surface normal of the wall, which can also be defined as a change in the tangential angle. With a uniform curvature, the wall thus describes a circular arc, while an edge describes a non-constant change in curvature, thus an abrupt change. As they continue, these surfaces can preferably be coiled into a spiral. Here, a spiral can be regarded as a constant change in curvature, in other words, the curvature does not change discontinuously.

The advantage of the invention lies in the fact that, due to the rounded geometry of the cooling air interface to the cooling air passage of the fan motor, the flow of air in the main air flow in this area is not disrupted and thus acoustically negative effects are avoided. In one especially advantageous embodiment of the invention, an adjoining spiral arrangement of the surfaces of the cooling air channel promotes the removal of dirt and moisture from the cooling air flow for the fan motor.

By changing the position of the cooling air channel in the main air flow and by varying the distance of the opposing cooling air channel walls in the area of the intake opening, the air flow scheme can be influenced and optimized, as well as influencing the share of cooling air diverted from the main air flow on the main air flow. The share of cooling air diverted from the main air flow on the main air flow can also be adjusted by varying the height of the intake opening.

BRIEF DESCRIPTION OF THE DRAWINGS

Further particulars, features and advantages of embodiments of the invention are derived from the following specification of embodiments with reference to the pertinent drawings. Shown are.

DESCRIPTION OF SPECIFIC EMBODIMENTS

Figure 1:
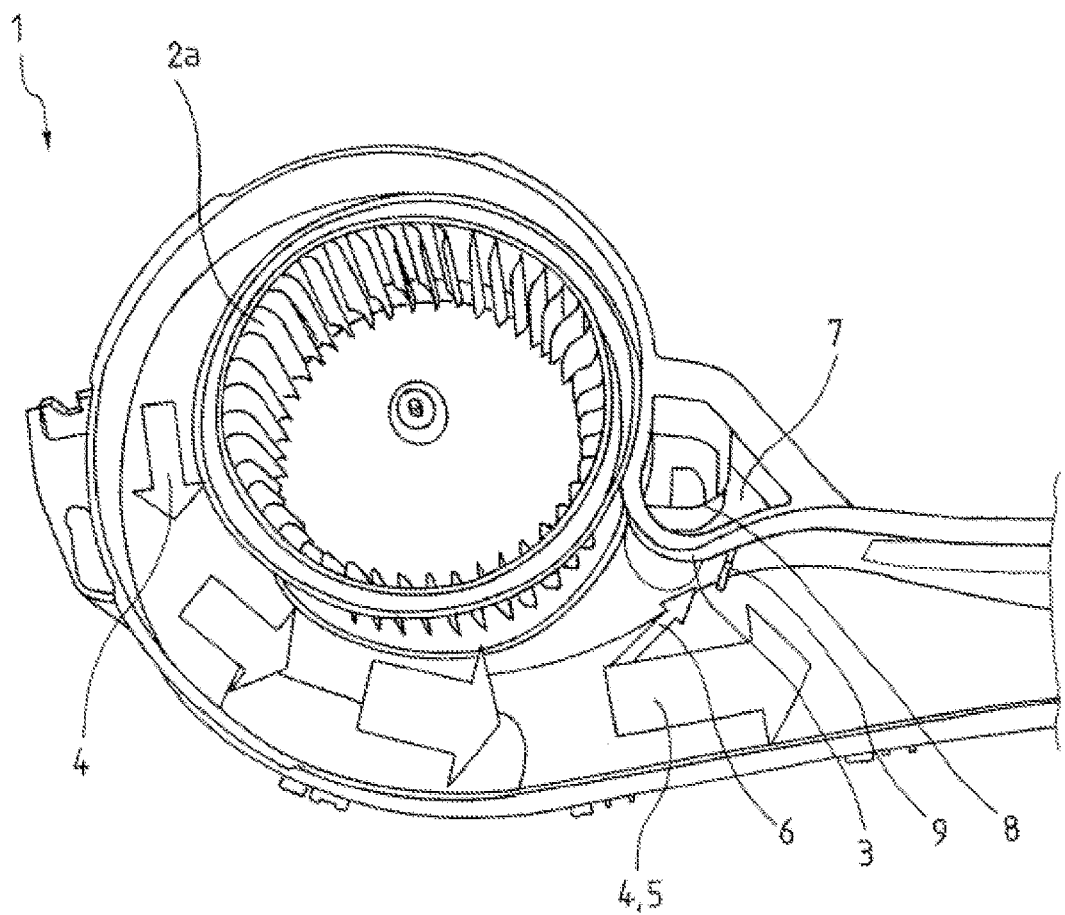
FIG. 1: a fan housing with a cooling air interface for the fan motor according to prior art.

FIG. 1 shows, as an example of the prior art, a top-down view of a fan 1, or more precisely, a fan housing 1 with an installed fan impeller 2*a*. The fan 1 generates air flow for the purpose of treatment, for example purification or conditioning, by means of the HVAC system. The air is brought to the fan 1 in recirculation mode from the vehicle interior, in fresh-air mode from the vehicle exterior, or in mixed mode in the form of a mixture of fresh and recirculated air. In addition to generating mechanical power at the fan impeller 2*a*, an electric motor of fan 1, not shown in FIG. 1, also generates waste heat, which as a rule is expelled by means of air circulation. For this purpose, on the compression side of fan 1, a cooling air interface 3 is inserted into the air flow 4 and directs the required quantity of cooling air 6 for cooling the electric motor from the main air flow 5 via a cooling air passage 7. Additionally, in the cooling air passage 7, a rib 8 is provided for holding back water. The heated air then flows out of the electric motor back to the suction side of the fan 1.

The high air velocities and the arrangement and geometry of the cooling air interface 3 of the HVAC unit to the cooling air passage 7 of the electric motor very often result in tonal effects, which have a negative impact on the acoustic properties of the air conditioner. As depicted in FIG. 1, often cooling air interfaces 3 are used with straight edges or corners 9, which in the air flow 4 lead to more or less severe disturbances and—often connected therewith—to tonal effects. FIG. 1 shows an example with a great potential for tonal manifestations.

Figure 2:
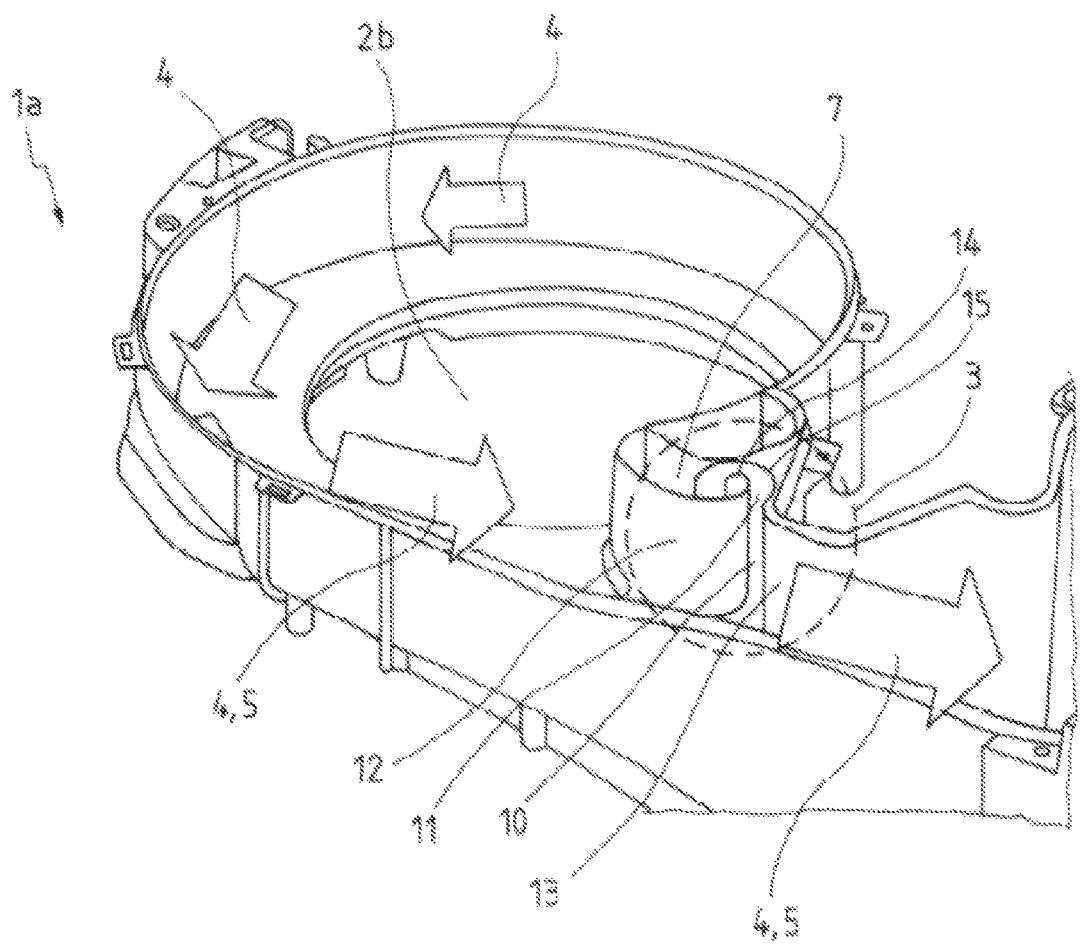
FIG. 2: a perspective view of the lower part of the fan housing with a cooling air interface according to the invention.

FIG. 2 shows a perspective view of the lower part 1*a* of a fan housing with a cooling air interface 3 according to the invention. The fan housing has a fan opening 2*b* for mounting the fan impeller, not shown. In addition, the fan housing comprises the cooling air interface 3, which is provided so that a portion of the air 4 emerging from a circular or spiral-shaped air flow path 4 running around the fan opening 2*b* and flowing upstream on the compression side of the fan, through a main air flow path 5, and, diverted from there, is directed into an intake opening 10 of a cooling air channel 11, which empties into the cooling air passage 7, via which the cooling air can reach the electric motor of the fan, not shown in FIG. 2.

Along with the cooling air channel 11 and its intake opening 10, the cooling air interface 3 comprises the wall areas 12, 13 adjoining the inlet opening 10 of the main air flow path 5. The first wall area 12, in relation to the air flow direction 5, is positioned upstream of the intake opening 10 and the second wall area 13, in relation to the air flow direction 5, is positioned downstream of the intake opening 10. The wall area 12 upstream of the intake opening 10 extends up to the adjoining intake opening 10, and from there transitions into a first cooling air channel wall 14 of cooling air channel 11 in the form of rounded surfaces without corners and edges. The wall area 13 downstream of the inlet opening 10 extends up to the adjoining intake opening 10 and from there transitions into a second cooling air channel wall 15 of cooling air channel 11 in the form of rounded surfaces without corners and edges. Thus, in the area of the HVAC interface to cooling air channel 11 of the electric fan motor, only rounded surfaces are used, which also means that corners and edges (see FIG. 1) are done away with. The two cooling air channel walls 14, 15 are spaced from one another, with the distance between them matching the channel width, which may be constant or variable in the further course of cooling air channel 11. According to the embodiment shown in FIG. 2, the cooling air channel 11 is curved into a spiral in its further course, wherein, within the spiral shape of the cooling air channel 11, the cooling air channel wall 14 is the inner and therefore shorter inner wall 14 of the spiral, and the cooling air channel wall 15 forms the outer, longer wall 15 of the spiral.

Figure 3:
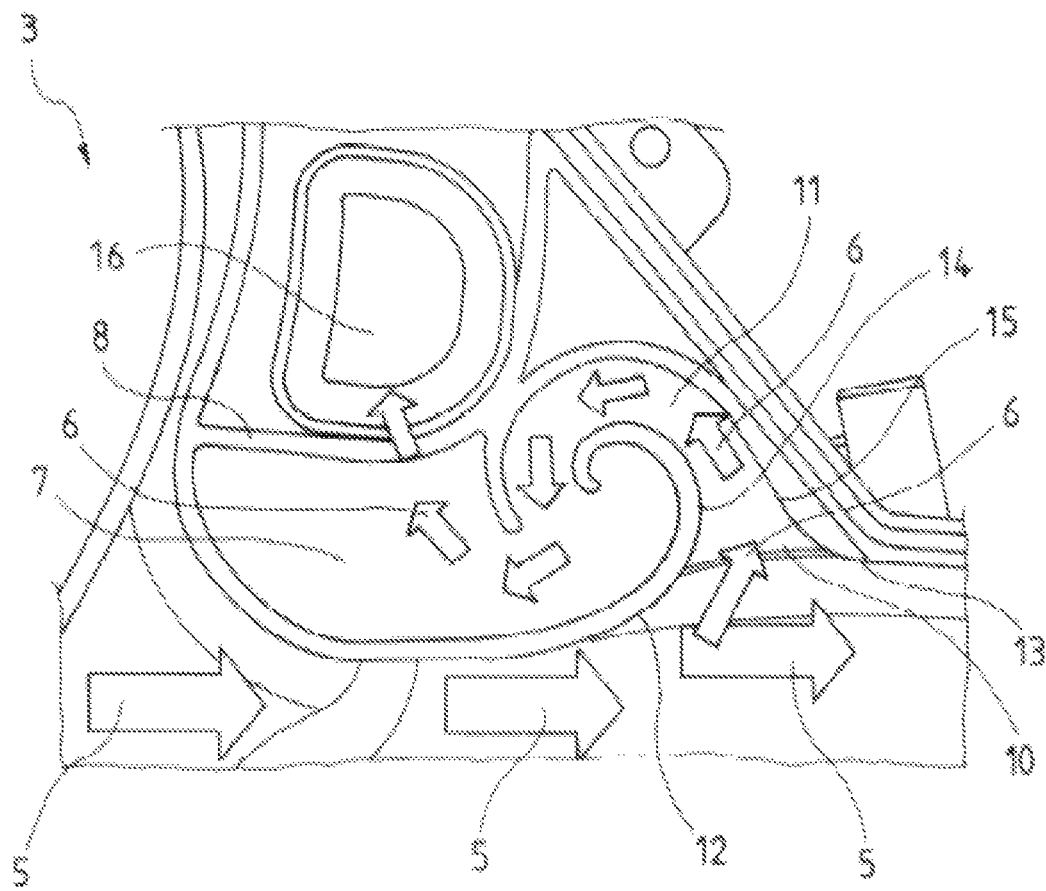
FIG. 3: a detailed top-down view of the cooling air interface of the fan housing.

FIG. 3 shows a detailed top-down view of the cooling air interface 3 of the fan housing, via which a cooling air flow 6 diverted from the main air flow 5 reaches the cooling air passage 7 and finally the cooling air outlet opening 16. Edges are dispensed with in the main air flow path 5, and the spiral coiling of the surfaces of the cooling air channel walls 14, 15 that adjoin wall areas 12, 13 and the intake opening 10 of cooling air channel 11 promotes the removal of dirt and moisture. As per the embodiment example shown in FIG. 3, in cooling air passage 7, a rib 8 is additionally provided for holding back water.

Figure 4:
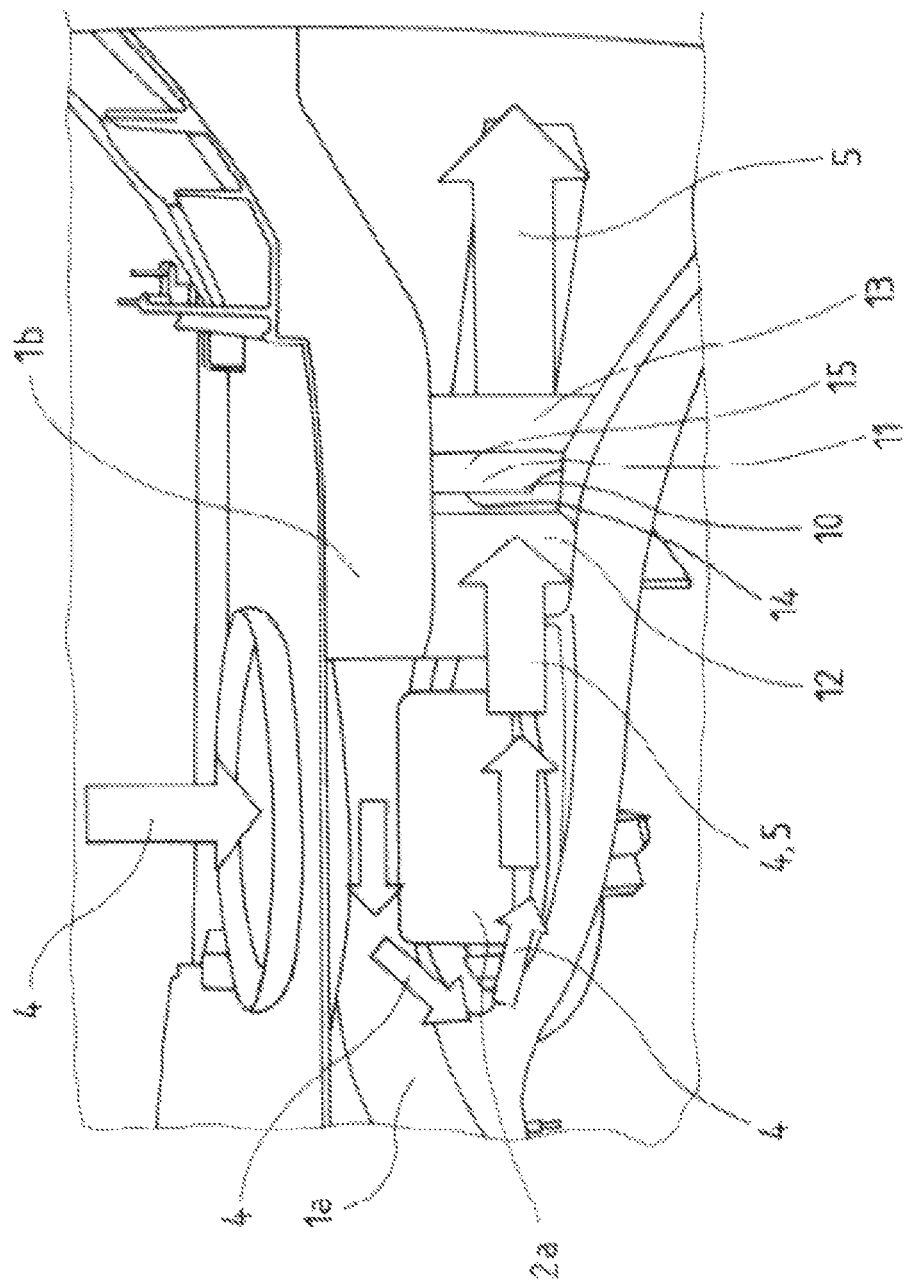
FIG. 4: a schematic side view of the fan housing in its installed state.

FIG. 4 shows a schematic side view of fan housing 1 matching the embodiment shown in FIGS. 2 and 3 in its installed state in the HVAC system, wherein the lower housing part 1*a* and the upper housing part 1*b* of the HVAC unit are mounted. The fan impeller 2*a* installed in the fan opening and the entering air flow are schematically depicted. The air is brought to the fan 1 in recirculation mode from the vehicle interior, in fresh-air mode from the vehicle exterior, or in mixed mode in the form of a mixture of fresh and recirculated air.

FIG. 4 uses arrows to show the air 4 entering on the suction side of fan 1 first into fan 1, and then, coming from a circular or spiral-shaped air flow path that runs around fan impeller 2, flowing downstream through a main air flow path 5. The wall sections 12, 13 along main air flow path 5, which adjoin the intake opening 10, each extend up to the adjoining intake opening 10, and then transition into the cooling air channel walls 14, 15 of cooling air channel 11 that lie opposite one another in the form of rounded surfaces without corners or edges.

Figure 5:
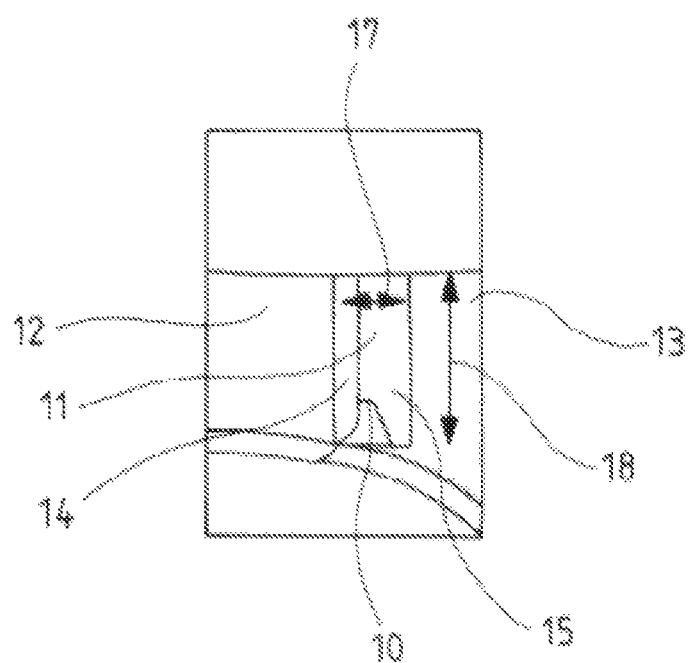
FIG. 5: a detailed depiction of the area of an intake opening into a cooling air channel.

FIG. 5 shows in detail the area of intake opening 10 of cooling air intake channel 11, including the wall areas 12, 13 that adjoin intake opening 10. The two cooling channel walls 14, 15 are spaced from one another, with the distance between the cooling air channel walls 14, 15 matching the channel width 17, which may be constant or variable in the further course of cooling air channel 11. The share of cooling air in the main air flow can be adjusted by varying the channel width 17 in the area of the intake opening 10 and the height 18 of the intake opening 11.

LIST OF REFERENCE SYMBOLS 1 fan housing, fan
1a lower part of fan housing
1b upper part of fan housing
2a fan impeller
2b fan opening for mounting of fan impeller
3 cooling air interface
4 air flow, air, air flow path
5 main airflow, main air flow path, air flow direction (of main air flow)
6 cooling air, cooling air flow
7 cooling air passage
8 rib for holding back water
9 edges and corners
10 intake opening
11 cooling air channel
12 (first) wall area (adjoining intake opening 10)
13 (second) wall area (adjoining intake opening 10)
14 cooling air channel wall, shorter spirally curved wall
15 cooling air channel wall, longer spirally curved wall
16 cooling air exit opening
17 channel width
18 height of intake opening 10

What is claimed is:

1. A cooling air interface in a fan housing for diverting an amount of cooling air required to cool a fan motor from a main air flow path on a compression side of a fan, and for delivering the cooling air to the fan motor to be cooled, the cooling air interface comprising:

a cooling air channel with an intake opening emptying into a cooling air passage having a cooling air exit opening delivering the cooling air to the fan motor;

wall areas of the main air flow path are located upstream and downstream of the intake opening and adjoin the intake opening extend into the cooling air channel, the wall areas of the main air flow path transitioning into cooling air channel walls situated opposite one another, the cooling air channel walls having rounded surfaces without corners and edges in a direction of air flow through the cooling air channel, wherein an end of one of the cooling air channel walls extends partially into the cooling air passage to partially divide the cooling air channel from the cooling air passage.

2. The cooling air interface according to claim 1, wherein the cooling air channel walls have at least in part a uniform curvature or a constantly changing curvature, wherein the cooling air channel is at least partly curved.

3. The cooling air interface according to claim 2, wherein an entirety of the cooling air channel has a curved shape in the direction of the air flow through the cooling air channel.

4. The cooling air interface according to claim 3, wherein the cooling air channel has a spiral shape, wherein a front one of the cooling air channel walls with respect to a direction of air flow from the intake opening is a shorter inner wall of the spiral shape and a rear one of the cooling channel walls is a longer outer wall of the spiral shape, wherein the shorter inner wall has a spiral shape.

5. The cooling air interface according to claim 4, wherein the cooling air passage includes a rib for holding back water is provided downstream of an emptying point of the cooling air channel and upstream of a cooling air exit opening in a flow direction of the cooling air, wherein the end of the one of the cooling air channel walls is an end of the longer outer wall and extends outwardly from the rib.

* * * * *